United States Patent Office 2,732,413
Patented Jan. 24, 1956

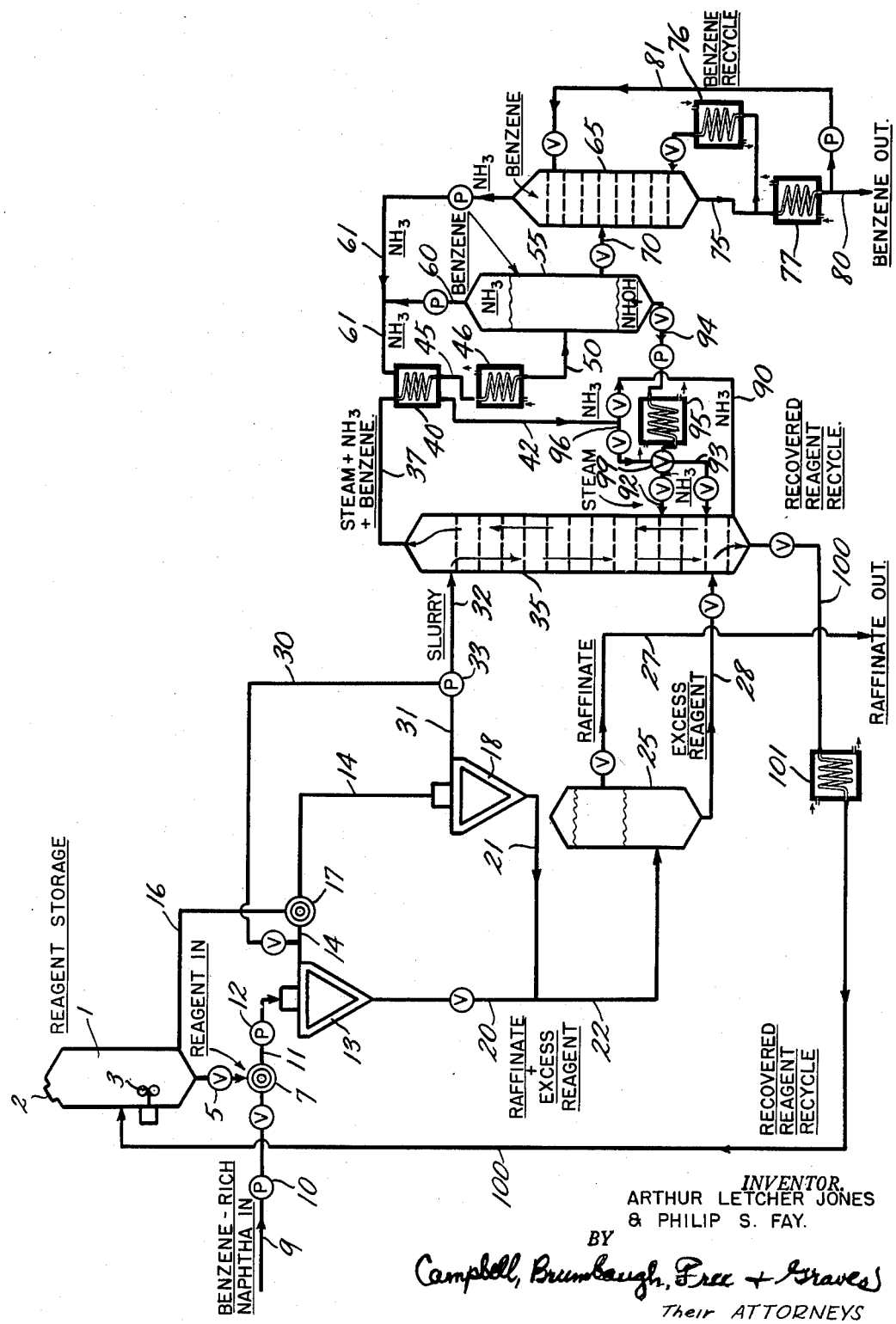

2,732,413

PROCESS FOR THE RECOVERY OF BENZENE BY SELECTIVE CLATHRATION

Arthur Letcher Jones and Philip S. Fay, Lyndhurst, Ohio, assignors to The Standard Oil Company, Cleveland, Ohio, a corporation of Ohio Application August 1, 1952, Serial No. 302,144

9 Claims. (Cl. 260—674)

This invention relates to a process and apparatus for the recovery of benzene from hydrocarbon stocks and, more particularly, to a cyclic process adapted for continuous operation for the recovery of benzene of high purity from low benzene hydrocarbon stocks, such as refinery naphthas.

Heretofore benzene has largely been obtained as a by-product of coking operations for the steel industry, and some of this was marketed as a low grade motor benzol. However, benzene production from this source has not increased, inasmuch as in the increase of steel production today, coke shortages are being met by bringing obsolete beehive coking ovens into use and these are not equipped with benzene recovery equipment.

Hydrogenation of coal has possibilities as a long-term solution to the increasing demand for benzene. The petroleum industry has sought to meet the requirements by synthesis of benzene from other hydrocarbons. The "hydroforming" process, the "platforming" process and a two-step isomerization and dehydrogenation process, among other reactions, involve the conversion of methyl cyclopentane and cyclohexane in narrow boiling $C_6$ cuts into benzene. The benzene content in the product stream from these processes, usually under 50%, is removed and purified as chemical grade benzene. The benzene can be removed by extractive distillation using phenol, or by a solvent extraction step, such as the Edeleanu liquid sulfur dioxide process. Each of these requires special equipment, extractive distillation, for example, requiring two towers and a recycling pump for the recovery of solvent.

Another source of benzene which has not yet been tapped because of the difficulty of extraction lies in ordinary refinery and catalytic process streams such as reformate, cracking coil distillate and catalytic stabilizer bottoms. These streams ordinarily contain a small quantity of benzene, for example up to 2%.

In accordance with the present invention, process and apparatus are provided for recovering benzene of high purity from such process streams.

The invention contemplates recovery of benzene by subjecting the hydrocarbon stock to the action of nickel ammonia cyanide to form a solid clathrate compound with the benzene, separating the clathrate compound from the stock and treating the clathrate compound with steam in the presence of ammonia to decompose it into benzene and nickel ammonia cyanide. The process and apparatus are adapted for continuous cyclic operation by recycling the nickel ammonia cyanide recovered from the steam ammonia decomposition to process another portion of the hydrocarbon stock.

Figure 1 is a schematic outline of a system of apparatus for carrying out the process of the invention.

The benzene-nickel ammonia cyanide complex is described in Nature, April 9, 1949, pages 566 and 567, and is thought to be a clathrate type of molecular compound in which the benzene molecule is imprisoned in the cage structure of the nickel ammonia cyanide. The latter is thought to have the composition $Ni(CN)_2.NH_3$, and one mole of this complex will take up one mole of the benzene to form the benzene-nickel ammonia cyanide complex whose composition is $Ni(CN)_2.NH_3.C_6H_6$. The latter complex is a solid and is sparsely soluble to insoluble in the liquid hydrocarbon stock, so that it can readily be removed therefrom by centrifugal separation or by filtration. It is not stable at normal room temperature.

The nickel ammonia cyanide complex of the invention is to be carefully distinguished from the complex ions formed by nickel and ammonia and by nickel and cyanide ions which have the formulas $[Ni(NH_3)_4]^{++}$ and $[Ni(CN)_4]^=$. These complexes contain 4 moles of ammonia and 4 moles of cyanide, respectively, per atomic weight of nickel, and their proportions are therefore quite different from the nickel cyanide and ammonia proportions in the nickel ammonia cyanide complex employed as the reagent in accordance with the invention.

The nickel ammonia cyanide employed as a reagent in the preparation of this complex (and referred to from time to time hereinafter simply as "the reagent") is obtained by dissolving nickel cyanide in concentrated ammonium hydroxide at room temperature or below on a mole to mole basis, or by dissolving nickel cyanide in an excess of ammonia, acidifying back to a point just short of precipitation of the complex. The solution becomes turbid at a pH of 10.8 to 11. However, the pH of the clear solution is not critical. Nor is the concentration of reagent in solution critical, for 15 to 30% solutions of reagent have been found equally effective. The precipitated complex contains one mole of ammonia and one mole of nickel cyanide. Because it is insoluble in water but soluble in ammonia solution, just enough ammonia is left unneutralized to solubilize the complex.

If nickel cyanide is not available, the reagent can be prepared from nickel sulfate and potassium cyanide according to the procedure of Hoffman and Arnoldi, Ber., 39, 339 (341) (1906). It is, however, essential that the reagent be free from any appreciable excess of ammonia. Preferably, not more than one mole of ammonia is used for each mole of nickel cyanide, plus a small amount of ammonia to solubilize the complex. In experiments carried out on hydrocarbon stocks with reagent containing one and two excess moles of ammonia per mole of cyanide no precipitate was obtained, and the refractive index of the hydrocarbon stock gave no indication that any benzene had been extracted to form a complex with the nickel ammonia cyanide reagent. This contrasted with solutions of the complex containing only the amount of ammonia required to solubilize the complex, wherein a solid benzene clathrate compound was formed and precipitated under exactly the same processing conditions.

The reaction between the nickel ammonia cyanide reagent and the benzene-containing hydrocarbon stock is expedited by efficient mixing, such as is obtainable in a turbohomogenizer. The reaction proceeds slowly, and therefore yields are improved by extended contact times. The smaller the proportion of benzene in the hydrocarbon stock, the longer the contact time that will be desirable. At high benzene concentrations, i. e., upwards of 5%, a contact time of 15 minutes should be ample, while at lower concentrations a contact time, up to one hour, may prove desirable. One to two hours mechanical mixing will give a maximum yield under most conditions.

The reaction temperature is not critical and suitable temperatures are disclosed in the literature. The reaction proceeds at a higher rate as temperature is increased, but completion of the reaction is favored at low temperatures of the order of 15 to 30° C. are satisfactory as well, and these would usually be used, for convenience.

The formation of the benzene clathrate compound appears to be hampered by the conversion of the hydrocarbon stock into minute droplets during the mixing, which droplets are immediately covered with a film of the nickel ammonia cyanide reagent. This film forms an emulsion of unusual stability, wherein the boundary solidity prevents exchange between the phases. To overcome this effect, it is desirable to employ an excess of the nickel ammonia cyanide reagent. Although extraction of a proportion of the benzene can be obtained by adding reagent on a mole to mole basis with the proportion of benzene in the hydrocarbon stock, a ratio of 1.5 moles of reagent per mole of benzene gives a noticeable improvement, while nearly complete extractions of benzene are obtainable through use of a ratio of 3 moles of reagent per mole of benzene. At high ratios and extended mixing times coprecipitation with nickel cyanide may occur. There is no reason to employ more reagent than will produce a noticeable improvement in yield, and the upper limit from the standpoint of coprecipitation appears to be 7.5 moles of reagent per mole of benzene.

A further improvement in yield can be obtained by cooling the reaction mixture after the mixing step has been completed. Cooling to 0° C. for one hour increases the yield quite noticeably when the mixing has been carried out at room temperature. Cooling to temperatures below 0° C. is better still, but usually the improvement is not commensurate with the cost of such cooling.

It will be appreciated that no exact conditions for carrying out the reaction can be given, since they depend to some extent upon individual requirements, such as the proportion of benzene in the hydrocarbon stock being treated and the equipment available. Those skilled in the art will know what conditions to select from the standpoint of economic operation and optimum recovery. It will be appreciated that good yields are obtainable using the minimum conditions set forth above; for example, a yield of 56% is obtaineded from a hydrocarbon stock containing 15% benzene on a single pass through a commercial homogenizer at the low ratio of 1.5 moles of nickel ammonia cyanide reagent per mole of benzene without subsequent cooling. On the other hand, excellent yields are obtainable using the optimum conditions; for example, from the same hydrocarbon stock containing 15% benzene, a yield of 94.5% was obtained by mixing the stock with the reagent for two hours at room temperature at a ratio of 7.5 moles of reagent per mole of benzene, followed by chilling for one hour at 0° C. before separating the solid clathrate compound from the resulting slurry.

After the solid clathrate compound has been separated, it is decomposed to recover the benzene and the nickel ammonia cyanide reagent. Various methods of decomposition are available, and a wide range of temperature, from 20 to 230° C., can be used. One method, using steam in the presence of ammonia, has been found to be particularly applicable in a commercial process, particularly a process in which the recovered reagent is to be recycled. Dry distillation of the clathrate compound involves prolonged heating at 200 to 230° C., and this leads to poor heat transfer, hold up and evaporation losses, with low yields. Cold concentrated ammonium hydroxide will slowly dissolve the complex, but frees only approximately half its benzene and thus is not feasible. On the other hand, when the complex is treated with boiling dilute ammonium hydroxide or with steam in the presence of ammonia, desirably at a temperature of from 95 to 120° C., preferably 100 to 110° C., the complex is rapidly disintegrated and the benzene steam-distills out. At the same time, the complex is redissolved in the solution. Thus benzene which steam-distills from the solution can be withdrawn and recovered, while solution containing the nickel ammonia cyanide can be withdrawn and recycled for treating another portion of the hydrocarbon stock.

The proportions of steam and ammonia are not critical and any amount of ammonia in excess of that in the complex, plus enough steam to dissolve the decomposition products, will serve. Usually from 500 to 1000% of steam and from 10 to 15% ammonia, by weight of the complex, is sufficient, but more than this could be used.

The system of apparatus shown in Figure 1 provides a mixing stage for treating the benzene-containing hydrocarbon stock with nickel ammonia cyanide reagent, at any desired temperature, centrifugal separation of the clathrate compound from the resulting slurry, a washing stage in which the effluent hydrocarbon stock from the centrifugal separator is treated with a second portion of nickel ammonia cyanide reagent, followed by a second separation, a settler for receiving raffinate from the separators and recovering excess reagent from the treated hydrocarbon stock, a benzene stripping tower with steam and benzene moving countercurrently to the clathrate compound dispersed as a slurry in dilute ammonia hydroxide solution, for decomposing the compound to benzene and nickel ammonia cyanide reagent, settlers and condensers for recovering benzene from the gases emerging from the stripper, and the necessary accompanying pumps, settling tanks, homogenizers, condensers and heat exchangers.

The apparatus of Figure 1 includes a reagent storage tank 1 with a hatch 2 for introduction of raw materials employed in forming the nickel ammonia cyanide reagent and a stirrer 3 for mixing the materials and preventing separation of any solid material contained therein. The reagent storage tank is connected by a line 5 to a homogenizer or other type mixer 7 where reagent is blended with the benzene-containing hydrocarbon stock pumped in from the line 9 by the pump 10. The blend can be held in the homogenizer for any desired time. If a continuous operation is desired, a very large blender can be provided from which only a small proportion of the contents can be withdrawn continuously at a rate equal to the rate of introduction of raw materials.

The blender is connected by the line 11, which is provided with the pump 12, to the centrifugal separator 13. Line 14 leads from the centrifugal separator 13 and carries the blend to a second centrifugal separator 18, in order to separate raffinate occluded in the slurry in the first mixing. A second line 16 from the reagent storage tank connects with 14 at a second homogenizer 17, to introduce fresh reagent for washing or reprocessing the slurry or raffinate.

Lines 20, 21 and 22 lead raffinate from the separators 13 and 18, respectively, to a settling tank 25. A line 27 conducts raffinate from the settling tank 25 out of the system and a second line 28 conducts excess reagent from the settling tank for recycling.

Lines 30 and 31 and pump 33 lead slurry from the separators 13 and 18 to the upper end of a stripper 35 provided with a packing or plates. At the top of the stripper a line 37 conducts benzene, steam and ammonia from the stripper to a heat exchanger 40 where it is partially cooled by a stream of ammonia passing to the other end of the stripper through the line 42. Then the benzene-steam-ammonia mixture passes from the heat exchanger by a line 45 to a condenser 46 where benzene and steam are condensed. A line 50 conducts the condensate to a settling tank 55 where ammonium hydroxide forms a lower layer, benzene an intermediate layer and ammonia gas rises to the top. A line 60 at the top of the settling tank 55 conducts ammonia gas to another line 61 which runs into the heat exchanger 40 from the benzene reflux tower 65. A line 70 from the settling tank 55 to the benzene reflux tower 65 conducts benzene for reflux and separation of ammonia. The reflux system includes a line 75 from the bottom of the benzene reflux tower leading to a heater 76 and a cooler 77. Pure benzene is withdrawn from the cooler by the line 80 or recycled to the benzene reflux tower 65 by the line 81, as desired.

The stripper 35 is provided at the bottom with a line 28 which leads thereto from the settling tank 25 for introduction of spent or excess reagent, an ammonia inlet line 90 which connects with line 42 leading from the heat exchanger 40, and steam and ammonia inlet lines 92 and 93 each connected to line 94 leading from the bottom of the benzene settling tank 55. In line 94 there is a heater 95. A by-pass line 96 connects line 42 with 92.

The line 100 recycles recovered reagent from the stripper 35 to the reagent storage tank 1 through the cooler 101.

The operation of the system is as follows: Reagent and hydrocarbon stock are blended in the homogenizer 7 and the resulting slurry travels through the line 11 and pump 12 to the centrifugal separator 13 where the solid complex is separated from the raffinate and the bulk of excess reagent and emerges as a pumpable slurry. The slurry can be pumped directly to the stripper via line 30. It is preferable, however, to use a wash to separate occluded raffinate by dilution with fresh reagent in the homogenizer 17 in line 14. Also, raffinate may be reprocessed in this stage instead of slurry to take up uncombined benzene.

The slurry from the separators is pumped to the top of the stripper 35 where it is stripped of benzene by countercurrent contact with hot steam and ammonia introduced at the base of the stripper at lines 90, 92 and 93. A temperature of 100 to 110° C. is maintained. The hot steam and ammonia decompose the complex, and to achieve this an excess of ammonia, say 10 to 15% by weight of the complex with 500 to 1000% of steam by weight of the complex, should be present at the top of the column. The complex will therefore decompose at this point, and nickel ammonia cyanide complex will move downwardly in the column while benzene liberated therefrom escapes through line 37. At the lower part of the stripper it is blended with spent or excess reagent introduced through line 28.

It is desirable to free the nickel ammonia cyanide complex from excess ammonia before it leaves the stripper via line 100, so that it can without further treatment be used to process another portion of hydrocarbon stock. This can be accomplished by adjustment of the valve 99 to control of the amount and points of entry, and of the heater 95 and other means to control the temperature, of ammonia and of steam injected into the system through lines 90, 92 and 93. The steam and ammonia strip ammonia from the nickel ammonia complex, and are injected at a temperature sufficient to remove ammonia to a point just short of precipitation of the complex (the precipitate contains one mole of ammonia and one mole of nickel cyanide), at which point the excess ammonia is at a minimum. The nickel ammonia cyanide complex at the bottom of the stripper has reached or is brought to its original condition by addition of spent reagent and by removal of ammonia introduced in decomposing the benzene complex, and yet remains in solution. Such a solution is ready for reuse, and after cooling in the cooler 101 can be pumped back to the reagent storage tank by line 100.

Overhead vapors from the stripping tower include benzene, ammonia and steam, and these are passed through line 37 to the heat exchanger 40 and then through a water-cooled condenser 46 to a settler 55 where aqueous ammonium hydroxide, benzene and ammonia are drawn off separately, the benzene in line 70 to a final distillation stage in the reflux tower 65 where dissolved ammonia is recovered. The gaseous ammonia from the settler and the reflux tower are returned through the lines 60 and 61 to the base of the stripping tower 35 at lines 90, 96, 92 and 93 and aqueous ammonia and steam through line 94 and thence lines 92 and 93 to the same tower.

The stripper might be operated under pressure for higher temperature and more rapid stripping and decomposition of the nickel ammonia cyanide benzene complex. Excess reagent from the settler 25 and the hot concentrated solution of nickel ammonia cyanide to be recycled could be blended to prevent crystallization of recycled reagent upon cooling, possibly in the lowest plate on the stripper. Cooling of the reagent below the lowest temperatures available in the water supply could be achieved by a simple ammonia refrigerating system, if necessary.

The following data is typical of the process of the invention, using suitable apparatus. The hydrocarbon stock used in obtaining this data contained the volumes of benzene indicated in the table:

*Table I*

| Example No. | Mole Ratio of Reagent Per Benzene | Mixing | | Cooling | | Benzene Conc. Volume (Percent) | Yield Complex (Wt. Percent of Theory) |
| --- | --- | --- | --- | --- | --- | --- | --- |
| | | Contact Time (Minutes) | Temp. | Contact Time (Minutes) | Temp., °C. | | |
| 1 | 1.5 | 5 | Room | None | None | 5.0 | 7.7 |
| 2 | 1.5 | 5 | do | None | None | 15.0 | 39.8 |
| 3 | 1.5 | 15 | do | None | None | 5.0 | 34.9 |
| 4 | 1.5 | 15 | do | None | None | 15.0 | 63.8 |
| 5 | 1.0 | 15 | do | 60 | 0 | 15.0 | 45.8 |
| 6 | 1.5 | 15 | do | 60 | 0 | 15.0 | 62.0 |
| 7 | 4.5 | 15 | do | 60 | 0 | 15.0 | 78.3 |
| 8 | 7.5 | 15 | do | 60 | 0 | 15.0 | 83.2 |
| 9 | 1.5 | 30 | do | None | None | 15.0 | 57.3 |
| 10 | 1.5 | 60 | do | None | None | 5.0 | 42.3 |
| 11 | 1.5 | 60 | do | None | None | 15.0 | 64.5 |
| 12 | 1.5 | 60 | do | None | None | 10.0 | 69.0 |
| 13 | 1.5 | 60 | do | None | None | 5.0 | 50.0 |
| 14 | 1.5 | 60 | do | 60 | 0 | 10.0 | 79.0 |
| 15 | 1.5 | 60 | do | 60 | 0 | 5.0 | 61.0 |
| 16 | 1.5 | 75 | do | None | None | 15.0 | 66.3 |
| 17 | 3.0 | 120 | do | None | None | 5.0 | 71.0 |
| 18 | 1.5 | 120 | do | 60 | 0 | 15.0 | 67.5 |
| 19 | 4.5 | 120 | do | 60 | 0 | 15.0 | 89.5 |
| 20 | 7.5 | 120 | do | 60 | 0 | 15.0 | 94.5 |
| 21 | 3.0 | 120 | do | None | None | 20.0 | 88.5 |
| 22 | 3.0 | 120 | do | None | None | 50.0 | 89.2 |
| 23 | 3.0 | 120 | do | None | None | 100.0 | 94.0 |
| 24 | 1.5 | (¹) | do | None | None | 15.0 | 56.0 |

¹ One pass through homogenizer.

The following comparative data shows the influence of mixing time, using n-heptane containing 5% benzene:

| Example No. | Ratio of Reagent Per Benzene | Mixing | | Cooling | | Benzene Conc. (Volume Percent) | Yield Complex (Wt. Percent of Theory) |
| --- | --- | --- | --- | --- | --- | --- | --- |
| | | Contact Time (Minutes) | Temp. | Contact Time (Minutes) | Temp. | | |
| 25 | 3.1 | 15 | Room | None | None | 5 | 46 |
| 26 | 3.1 | 30 | do | None | None | 5 | 62 |
| 27 | 3.1 | 45 | do | None | None | 5 | 64 |
| 28 | 3.1 | 60 | do | None | None | 5 | 64 |

The following comparative data shows the influence of reagent ratio on the same stock:

| Example No. | Ratio of Reagent Per Benzene | Mixing | | Cooling | | Benzene Conc. (Volume Percent) | Yield Complex (Wt. Percent of Theory) |
| --- | --- | --- | --- | --- | --- | --- | --- |
| | | Contact Time (Minutes) | Temp. | Contact Time (Minutes) | Temp. | | |
| 29 | 1:1.5 | 120 | Room | None | None | 5 | 18 |
| 30 | 2:1 | 120 | do | None | None | 5 | 52 |
| 31 | 3:1 | 120 | do | None | None | 5 | 62 |
| 32 | 4:1 | 120 | do | None | None | 5 | 62 |
| 33 | 5:1 | 120 | do | None | None | 5 | 62 |
| 34 | 6:1 | 120 | do | None | None | 5 | 64 |
| 35 | 7:1 | 120 | do | None | None | 5 | 64 |

*Table II*

The reagent concentration is shown to have little effect on purity using a reagent ratio of 3.1 and a mixing contact time of two hours at room temperature.

| Example No. | cc./5% $C_6H_6$ in n-Heptane | cc. Percent Reagent | cc. Percent $H_2O$ Added | Refractive Index of Raffinate |
|---|---|---|---|---|
| 36 | 5.7 | 30.0 | 0 | 1.3873 |
| 37 | 3.1 | 22.0 | 11.0 | 1.3871 |
| 38 | 2.85 | 15.0 | 15.0 | 1.3871 |

The following data was taken on typical refinery naphtha streams:

Table III

| | 70–90° C. Cut, Percent of Total | Percent Benzene (Infrared Analyses) | | Percent Benzene (Calc'd. from Wt. Complex) | |
|---|---|---|---|---|---|
| | | Cut | Total | Cut | Total |
| Naphtha Catalytic Reformate | 8.0 | 6.5 | 0.52 | 8.9 | 0.71 |
| Cracking coil Distillate | 9.5 | 3.0 | 0.28 | 9.5 | 0.90 |
| Catalytic Stabilizer Bottoms | 5.5 | 4.0 | 0.22 | 8.6 | 0.47 |
| Do | 4.75 | 9.5 | 0.45 | 10.2 | 0.49 |

Reaction conditions: Reagent/benzene ratio 7.5:1 on estimated benzene content. Shaken 2 hours at room temperature and cooled 1 hour at 0° C.

The benzene obtained from a catalytic reformate 160–200° F. cut which contained 20% benzene yielded a benzene upon extraction in accordance with the invention whose refractive index was $n_D^{25}$ 1.4978. Reagent grade benzene has a refractive index of $n_D^{25}$ 1.4968, and pure benzene a refractive index of $n_D^{25}$ 1.4979.

It is thus evident that the benzene recovered from the clathrate compound is extremely pure. This undoubtedly is due to the high specificity of the reagent for benzene. The results, from the standpoint of purity, are difficult to approach by extractive distillation or solvent extraction processes.

The concentration of benzene in the hydrocarbon stock can be varied within wide limits, and stocks having low benzene contents can be processed in accordance with the conditions outlined heretofore.

The nickel ammonia cyanide reagent employed in the process is expensive, but inasmuch as the process contemplates its substantially complete recovery upon decomposition of the benzene clathrate compound, there is no expense required in this respect apart from the initial investment. In any event, the available solvent extraction or extractive distillation processes for the recovery of benzene are not economically applicable to hydrocarbon stocks containing low benzene contents of the order of concentration which can be treated in accordance with the process of the invention.

All parts and percentages in the specification and claims are by weight.

The term "yield" as employed herein refers to the proportion of benzene extracted in the process compared to the original concentration of benzene in the hydrocarbon stock treated.

We claim:

1. A cyclic process adapted for continuous operation for the recovery of benzene of high purity from benzene-containing hydrocarbon stocks which comprises subjecting the stock to the action of nickel ammonia cyanide to form a solid clathrate compound with benzene, separating the clathrate compound from the stock, treating the clathrate compound with steam in the presence of ammonia to decompose it into benzene and nickel ammonia cyanide, recovering benzene and recycling the nickel ammonia cyanide to process another portion of the stock.

2. A cyclic process adapted for continuous operation for the recovery of benzene of high purity from benzene-containing hydrocarbon stocks which comprises subjecting the stock to the action of nickel ammonia cyanide in the ratio from 1.5 to 7.5 moles thereof per mole of benzene in the stock to form a solid clathrate compound with benzene, separating the clathrate compound from the stock, treating the clathrate compound with steam in the presence of ammonia to decompose it into benzene and nickel ammonia cyanide, recovering benzene and recycling the nickel ammonia cyanide to process another portion of the stock.

3. A cyclic process adapted for continuous operation for the recovery of benzene of high purity from benzene-containing hydrocarbon stocks which comprises subjecting the stock to the action of nickel ammonia cyanide to form a solid clathrate compound with benzene, cooling the resulting slurry and then separating the clathrate compound from the stock, treating the clathrate compound with steam in the presence of ammonia to decompose it into benzene and nickel ammonia cyanide, recovering benzene and recycling the nickel ammonia cyanide to process another portion of the stock.

4. A process in accordance with claim 3 in which the slurry is cooled to 0° C.

5. A cyclic process adapted for continuous operation for the recovery of benzene of high purity from benzene-containing hydrocarbon stocks which comprises subjecting the stock for at least one hour at room temperature to the action of about 7.5 moles nickel ammonia cyanide per mole of benzene in the stock to form a solid clathrate compound with benzene, cooling the resulting slurry to 0° C. and holding it at that temperature for at least about one hour, separating the clathrate compound from the stock, treating the clathrate compound with steam in the presence of ammonia to decompose it into benzene and nickel ammonia cyanide, recovering benzene and recycling the nickel ammonia cyanide to process another portion of the stock.

6. A cyclic process adapted for continuous operation for the recovery of benzene of high purity from benzene-containing hydrocarbon stocks which comprises blending the stock with nickel ammonia cyanide, homogenizing the blend to form a solid clathrate compound with benzene, cooling the resulting slurry, centrifugally separating the clathrate compound from the stock, countercurrently stripping the clathrate compound with steam and ammonia to decompose it into benzene and nickel ammonia cyanide, recovering benzene, steam and ammonia at one end and nickel ammonia cyanide at the other end of the stripper and recycling the nickel ammonia cyanide to process another portion of the stock.

7. A continuous process for the recovery of benzene of high purity from benzene-containing hydrocarbon stocks which comprises continuously blending a stream of the stock with a stream of nickel ammonia cyanide, conducting the blend to a homogenizer and homogenizing the blend to form a solid clathrate compound with benzene, conducting the resulting slurry to a centrifugal separator and centrifugally separating the solid clathrate compound from the stock, conducting the clathrate compound to a stripper and countercurrently flowing the slurry against a stream of steam and ammonia to decompose the clathrate compound into benzene and nickel ammonia cyanide, recovering benzene, steam and ammonia at the top of the stripper and drawing off recovered nickel ammonia cyanide at the bottom of the stripper and recycling the nickel ammonia cyanide to process another portion of the stock.

8. A process in accordance with claim 7 in which the nickel ammonia cyanide is blended in the proportion of from 1.5 to 7.5 moles per mole of benzene in the stock stream.

9. A continuous process for the recovery of benzene of high purity from benzene-containing hydrocarbon stocks which comprises continuously blending a stream of the stock with a stream of nickel ammonia cyanide, conducting the blend to a homogenizer and homogenizing the blend to form a solid clathrate compound with benzene, blending a second stream of nickel ammonia cyanide with the resulting slurry and homogenizing the resulting blend to form a solid clathrate compound with uncombined benzene, conducting the resulting slurry to a centrifugal separator and centrifugally separating the solid clathrate compound from the stock, conducting the clathrate compound to a stripper and countercurrently flowing the slurry against a stream of steam and ammonia to decompose the clathrate compound into benzene and nickel ammonia cyanide, recovering benzene, steam and ammonia at one end of the stripper and drawing off recovered nickel ammonia cyanide at another end of the stripper, and recycling the nickel ammonia cyanide to process another portion of the stock.

References Cited in the file of this patent

UNITED STATES PATENTS

| | | |
|---|---|---|
| 2,499,820 | Fetterly | Mar. 2, 1950 |
| 2,588,602 | Adams et al. | Mar. 11, 1952 |
| 2,596,344 | Newey et al. | Mar. 13, 1952 |
| 2,627,513 | Arey | Feb. 3, 1953 |

OTHER REFERENCES

Bull. Acad. Sci., U. R. S. S. classe Sci. Math. Nat. Ser. chin., 1937, pages 435–41, Abstracted in Chem. Abs., volume 31, page 7349 (1937), article by Hal'pern.

Nature, volume 163, pages 566–7 (1949), article by Powell.

J. Chem. Soc. (London), 1948, pages 61–73, article by Powell.

J. Chem. Soc. (London), 1950, page 3346, article by Evans et al.